(12) United States Patent
Birk et al.

(10) Patent No.: US 12,553,770 B2
(45) Date of Patent: Feb. 17, 2026

(54) METHOD AND APPARATUS CONFIGURED TO COUNT N-PHOTON EVENTS

(71) Applicant: LEICA MICROSYSTEMS CMS GMBH, Wetzlar (DE)

(72) Inventors: Holger Birk, Wetzlar (DE); Frank Hecht, Wetzlar (DE); Luis Alvarez, Wetzlar (DE); Bernd Widzgowski, Wetzlar (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 131 days.

(21) Appl. No.: 17/920,054

(22) PCT Filed: Apr. 23, 2021

(86) PCT No.: PCT/EP2021/060714
§ 371 (c)(1),
(2) Date: Oct. 20, 2022

(87) PCT Pub. No.: WO2021/214312
PCT Pub. Date: Oct. 28, 2021

(65) Prior Publication Data
US 2023/0175886 A1    Jun. 8, 2023

(30) Foreign Application Priority Data

Apr. 24, 2020   (EP) .................................... 20171421

(51) Int. Cl.
*G01J 1/44*    (2006.01)
*G01N 21/64*    (2006.01)
*G02B 21/00*    (2006.01)

(52) U.S. Cl.
CPC ............ *G01J 1/44* (2013.01); *G01N 21/6408* (2013.01); *G01N 21/6458* (2013.01);
(Continued)

(58) Field of Classification Search
None
See application file for complete search history.

(56) References Cited

U.S. PATENT DOCUMENTS

| | | | |
|---|---|---|---|
| 5,401,951 A * | 3/1995 | Butler | H01J 43/246 250/214 VT |
| 6,342,701 B1* | 1/2002 | Kash | G01J 3/2889 250/458.1 |

(Continued)

FOREIGN PATENT DOCUMENTS

| | | |
|---|---|---|
| CN | 110806263 A | 2/2020 |
| DE | 11 2011 102595 T5 | 5/2013 |

(Continued)

*Primary Examiner* — David J Makiya
*Assistant Examiner* — Djura Malevic
(74) *Attorney, Agent, or Firm* — LEYDIG, VOIT & MAYER, LTD.

(57) ABSTRACT

An apparatus is configured to count N-photon events within a time-dependent sequence of events of interactions of a plurality of photons with a light sensitive detector. The apparatus includes a signal-processing device and the light sensitive detector. An N-photon event represents an occurrence of at least N timely overlapping single photon events. The light sensitive detector is adapted to generate a time-dependent digital signal comprising digital patterns representing the time-dependent sequence of events from the detection of the plurality of photons with the light sensitive detector. Each digital pattern in the digital signal comprises a digital pattern width having a continuous sequence of digital values representing at least one event of interaction of at least one photon with the light sensitive detector. The signal-processing device is adapted to identify N-photon events from the digital patterns in the digital signal in dependence from the respective digital pattern width.

16 Claims, 7 Drawing Sheets

(52) U.S. Cl.
CPC ..... *G02B 21/0076* (2013.01); *G02B 21/0084* (2013.01); *G01J 2001/442* (2013.01)

(56) References Cited

U.S. PATENT DOCUMENTS

| | | | | |
|---|---|---|---|---|
| 6,596,980 | B2* | 7/2003 | Rusu | G01R 31/311 |
| | | | | 250/214.1 |
| 6,944,220 | B2* | 9/2005 | Neubauer | H03H 17/04 |
| | | | | 375/232 |
| 8,797,522 | B2* | 8/2014 | Namba | G01J 1/10 |
| | | | | 356/226 |
| 10,660,589 | B2* | 5/2020 | Roessl | A61B 6/42 |
| 11,215,503 | B2* | 1/2022 | Birk | G01J 1/44 |
| 11,262,465 | B2* | 3/2022 | Birk | G01J 1/46 |
| 11,656,374 | B2* | 5/2023 | Maruno | H04N 25/65 |
| | | | | 348/301 |
| 11,874,213 | B2* | 1/2024 | Petersen | H03F 3/45475 |
| 11,892,613 | B2* | 2/2024 | Oron | G02B 21/0072 |
| 2007/0170353 | A1* | 7/2007 | Chou | G01J 1/42 |
| | | | | 250/214.1 |
| 2008/0270073 | A1* | 10/2008 | Eggeling | G01N 21/6445 |
| | | | | 702/180 |
| 2009/0159812 | A1* | 6/2009 | Livingston | G01N 15/1456 |
| | | | | 250/428 |
| 2009/0234202 | A1* | 9/2009 | Goix | A61B 5/415 |
| | | | | 436/86 |
| 2010/0213353 | A1* | 8/2010 | Dierickx | G01T 1/247 |
| | | | | 250/214 R |
| 2011/0108712 | A1* | 5/2011 | Thomas | G01J 1/44 |
| | | | | 250/214 R |
| 2011/0210235 | A1* | 9/2011 | Dierickx | G01T 1/17 |
| | | | | 250/214 R |
| 2012/0070846 | A1* | 3/2012 | Kameoka | G01N 33/582 |
| | | | | 435/7.1 |
| 2013/0032699 | A1* | 2/2013 | Widzgowski | G01J 1/44 |
| | | | | 250/214 SW |
| 2013/0099100 | A1* | 4/2013 | Pavlov | G01T 1/248 |
| | | | | 250/208.2 |
| 2013/0114073 | A1* | 5/2013 | Namba | G01J 1/10 |
| | | | | 356/226 |
| 2013/0119276 | A1* | 5/2013 | Widzgowski | G01N 21/6458 |
| | | | | 250/200 |
| 2013/0210028 | A1* | 8/2013 | Pache | G01N 33/585 |
| | | | | 435/7.2 |
| 2014/0027607 | A1* | 1/2014 | Mordarski | G01J 1/44 |
| | | | | 250/206 |
| 2014/0191136 | A1 | 7/2014 | Loeliger et al. | |
| 2015/0286040 | A1* | 10/2015 | Schreiber | G02B 21/0064 |
| | | | | 250/459.1 |
| 2016/0178520 | A1* | 6/2016 | Livingston | G01N 21/645 |
| | | | | 506/9 |
| 2017/0187721 | A1* | 6/2017 | Raynor | H01L 31/107 |
| 2018/0259629 | A1* | 9/2018 | Oohata | G01S 17/10 |
| 2018/0353957 | A1* | 12/2018 | Bishop | G01N 15/1429 |
| 2019/0339201 | A1* | 11/2019 | Seyfried | G01N 21/6458 |
| 2020/0103538 | A1* | 4/2020 | Birk | G01J 1/46 |
| 2020/0386616 | A1* | 12/2020 | Birk | G02B 21/0096 |
| 2021/0025757 | A1* | 1/2021 | Yamamoto | G01J 3/4406 |
| 2022/0260819 | A1* | 8/2022 | Oron | G02B 21/008 |

FOREIGN PATENT DOCUMENTS

| | | |
|---|---|---|
| DE | 102018133443 A1 | 6/2020 |
| EP | 2 592 413 A2 | 5/2013 |
| JP | 2005/241798 A | 9/2005 |
| JP | 2016-146286 A | 8/2016 |
| JP | 2019/074319 A | 5/2019 |
| WO | WO 2014/059983 A1 | 4/2014 |
| WO | WO 2017/202980 A1 | 11/2017 |

* cited by examiner

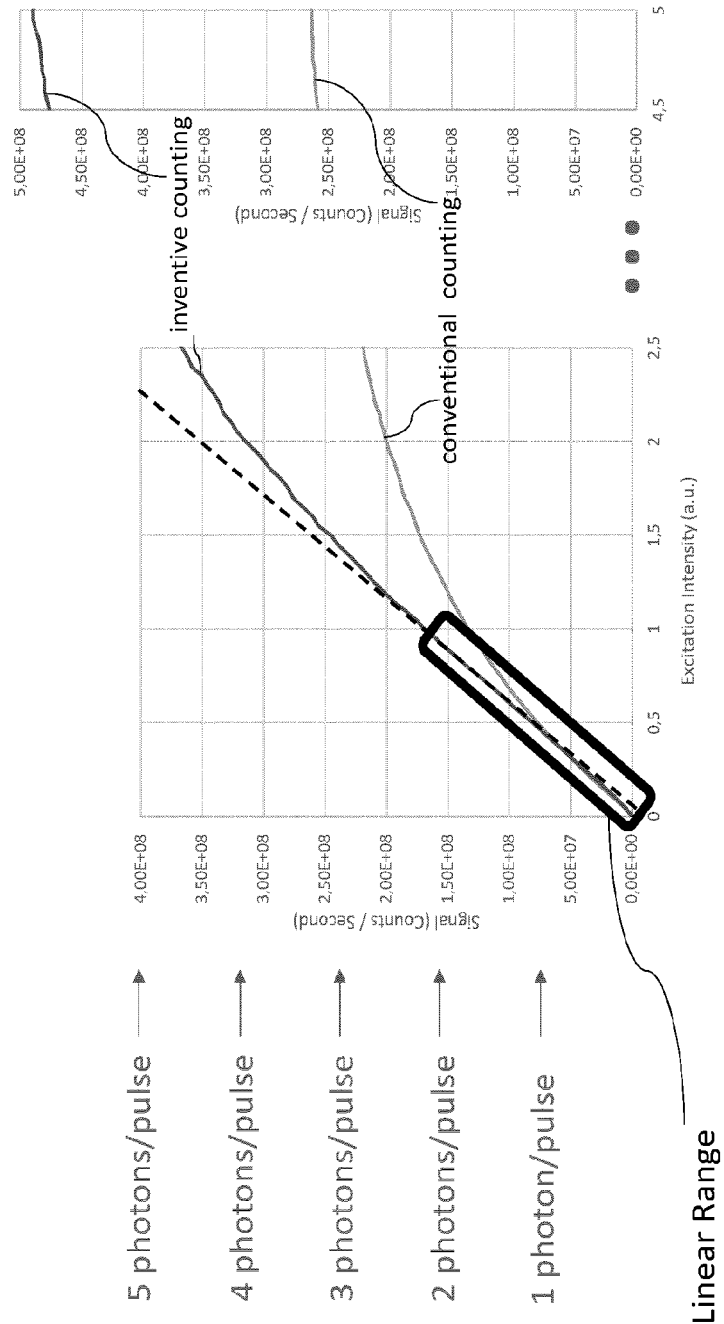

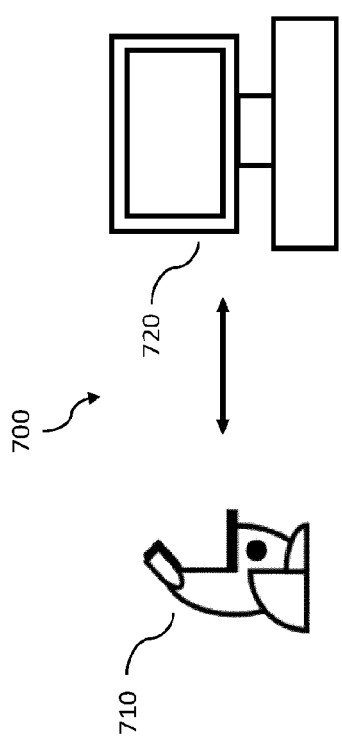

METHOD AND APPARATUS CONFIGURED TO COUNT N-PHOTON EVENTS

CROSS REFERENCE TO RELATED APPLICATIONS

This application is a U.S. National Phase application under 35 U.S.C. § 371 of International Application No. PCT/EP2021/060714, filed on Apr. 23, 2021, and claims benefit to European Patent Application No. EP 20171421.9, filed on Apr. 24, 2020. The International Application was published in English on Oct. 28, 2021 as WO 2021/214312 A1 under PCT Article 21(2).

FIELD

The present invention relates to a method and an apparatus configured to count N-photon events.

BACKGROUND

Conventional photon counting for example of luminescent light which might have been acquired by a microscope, in particular a scanning microscope or a confocal scanning microscope, works accurately at low detection signal intensities which might be caused by low illumination light intensity of the sample. In such a situation, photons are hitting the light sensitive detector sparsely. However, in case the illumination light intensity is slightly increased, two or more photons might hit the detector essentially at the same time and it may not be possible to differentiate between an event of one or more photons that interacted with the light sensitive detector.

The document WO 2017/202980 A1 discloses amongst other things a method for determining the fluorescence lifetime of fluorescent dyes in a microscope system which discards multi-photon events which might have been detected by the light sensitive detector.

SUMMARY

In an embodiment, the present disclosure provides an apparatus configured to count N-photon events within a time-dependent sequence of events of interactions of a plurality of photons with a light sensitive detector. The apparatus includes a signal-processing device and the light sensitive detector. N is a natural number being larger than 1. An N-photon event of the N-photon events represents an occurrence of at least N timely overlapping single photon events. The light sensitive detector is adapted to generate a time-dependent digital signal comprising digital patterns representing the time-dependent sequence of events from the detection of the plurality of photons with the light sensitive detector. Each digital pattern in the digital signal comprises a digital pattern width having a continuous sequence of digital values representing at least one event of interaction of at least one photon with the light sensitive detector. The signal-processing device is adapted to identify N-photon events from the digital patterns in the digital signal in dependence from the respective digital pattern width. The amount of the N-photon events are counted.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 6 shows, schematically, a diagram of the signal counts per second as a function of the illumination light intensity; and FIG. 7 shows, schematically, a system comprising a microscope and a computer system, wherein the system is configured to perform a method described herein.

DETAILED DESCRIPTION

Figure 1:
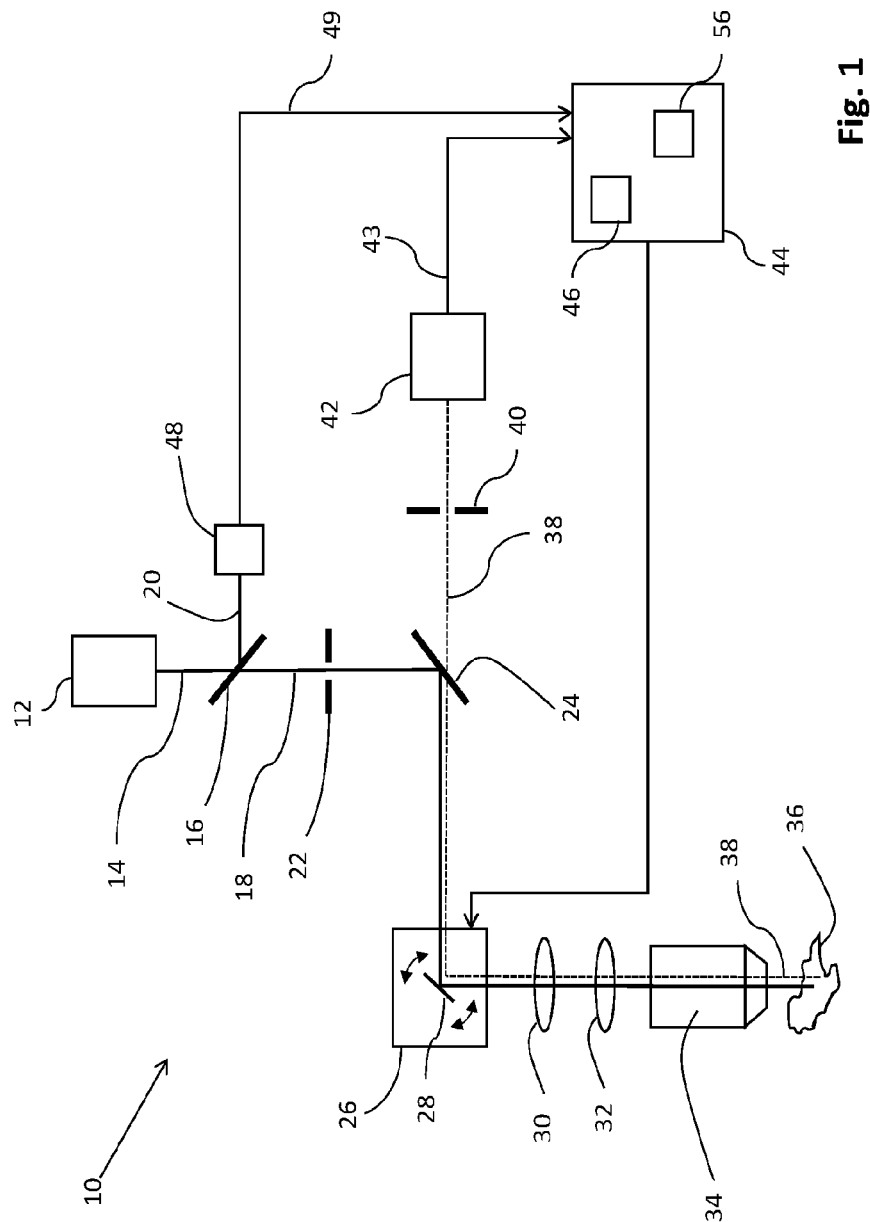
FIG. 1 shows, schematically, a confocal microscope system which comprises an apparatus according to the present invention.

The inventors have recognized that in some cases it might be desirable to consider multi-photon events in such photon counting measurements. Embodiments of the present invention therefore provide a method and an apparatus which is configured to count N-photon events within a time-dependent sequence of events of interactions of a plurality of photons with a light sensitive detector.

Embodiments of the present invention relate to an apparatus being configured to count N-photon events within a time-dependent sequence of events of interactions of a plurality of photons with a light sensitive detector, wherein N may be a natural number being larger than 1, wherein in a preferred embodiment N is 2. In particular embodiments, this can be done during at least one finite time duration, e.g. between two adjacent light pulses of a light source. An N-photon event may represent an occurrence of at least N timely overlapping single photon events, wherein "timely overlapping" might be understood in the sense of that e.g. two or more photons are interacting with the light sensitive detector during a dead time of the detection system, in particular during an image acquisition time equal or lower than the dead time of the detection system. The apparatus may comprise a signal-processing device and the light sensitive detector, wherein the light sensitive detector is adapted to generate a time-dependent digital signal—wherein a time-dependent analog signal might have been converted to the digital system by a suitable converting means/electronic circuitry—comprising digital patterns representing the time-dependent sequence of events from the detection of the plurality of photons with the light sensitive detector. Each digital pattern in the digital signal may comprise a digital pattern width having a continuous sequence of digital values. The digital values are, in a preferred embodiment, 0 and 1. The digital values may represent at least one event of interaction of at least one photon with the light sensitive detector. The signal-processing device may be adapted to identify N-photon events from the digital patterns in the digital signal in dependence from the respective digital pattern width. The amount of the N-photon events can be counted. In a preferred embodiment, the counting of the N-photon events is performed during the respective finite time duration mentioned above.

According to embodiments of the present invention, it is advantageously possible to perform photon counting with a higher accuracy, and in particular overcomes the limitations mentioned above, e.g. at higher illumination intensities of a sample. It is possible to distinguish overlapping photon events from a single photon event. Overlapping photons might be understood in the sense of photons arriving or interacting with the light sensitive detector with an arrival time difference that is smaller than or equal to the temporal width of a single photon detection signal and/or a temporal pulse response function of a single photon event. With the present invention it is possible to achieve a better determination and/or discrimination of "zero values" resulting in measurement or counting results having a higher dynamic range and/or accuracy for the single photon events and for the two photon events—the actual interactions of the photons with the light sensitive detector in particular being independent of noise or there might be no or a reduced dependency of detection system noise. Generally speaking, the identification of N-photon events within the digital pattern representing the time-dependent sequence of events of interactions of the plurality of photons of light with a light sensitive detector can be regarded as a pattern recognition of a digital data stream, wherein the digital data stream is time correlating to the actual occurring sequence of events of interactions of the plurality of photons of light with a light sensitive detector.

The signal-processing device might be adapted to identify a digital pattern as an N-photon event if the digital pattern width of the digital pattern is larger than N−1 times of the digital pattern width being representative for a single photon event. There might be defined an additional range for the digital pattern width about which the identification of a digital pattern as an N-photon event might be made. For example if a 2-photon event is to be identified (i.e. N=2 in this example), the digital pattern width being representative for a single photon event might be regarded as having a predefined value of e.g. 5 time units, wherein a time unit might be a period of time depending on a sample frequency of the digital sampling of an analog signal being generated by the light sensitive detector in response of an interaction with 1 photon. In this example, a 2-photon event might be identified for a digital pattern that is larger than the 5 time units, however, if the additional range for the digital pattern width about which the identification of a digital pattern as the 2-photon event is considered, the digital pattern width for which a 2-photon event is identified might be 8 time units or 6 time units.

Additionally or alternatively, the signal-processing device could be adapted to identify a digital pattern as an N-photon event, if the digital pattern width of the digital pattern is larger than the digital pattern width being representative for a single photon event and smaller or equal than N times of the digital pattern width being representative for a single photon event. An additional range for the digital pattern width might be considered in this case as well, however, in a preferred embodiment, this should be consistently defined in case the subject matter of this paragraph is combined with the subject matter of the previous paragraph.

The apparatus could be further configured such that the signal-processing device is adapted to identify a digital pattern as a single photon event if the digital pattern width of the digital pattern is essentially representing the X times of the time duration of an impulse response/impulse response function of a single photon event, wherein X is a real number out of the range between 0.5 and 1.5, wherein X is, in a preferred embodiment, 1.0. Usually, a single photon event has a defined temporal interaction with the light sensitive detector and preferably the duration of this temporal interaction with the light sensitive detector might be regarded as the time duration of the impulse response of the light sensitive detector and/or the digitizing electronics. X might additionally or alternatively depend on the detector characteristics. In a preferred embodiment, the apparatus is further configured to consider the count of the identified single photon events as well.

The signal-processing device could be adapted to identify a digital pattern as a false positive or faulty signal if the digital values of the digital pattern do not represent an event of interaction of a photon with the light sensitive detector or if the digital pattern width of the digital pattern is smaller than Y times of the time duration of an impulse response of a single photon event. Y is a real number out of the range between 0.0 and 0.49, wherein Y is, in a preferred embodiment, 0.24. A false positive signal might not represent an event of an interaction of a photon with the light sensitive detector.

The above mentioned values for the real numbers X and/or Y might depend from a statistical distribution of the digital pattern width of the detected events, and/or might depend on an imperfection of detection system. The imperfection of detection system could be e.g. jitter being generated by inconsistencies of generated electrons within the light sensitive detector or the inconsistencies of the generation of a system clock by an internal clock generation unit or a sample frequency of the analog signal. Because the result of X times of the time duration of an impulse response/impulse response function of a single photon event and/or the result of Y times of the time duration of an impulse response of a single photon event might be a real number, it might make sense to select as the value being actually used for the X and/or Y to be the higher or lower adjacent natural number of the result of the multiplication.

A light source could be adapted to generate a sequence of illumination light pulses or to generate modulated light.

In a preferred embodiment, a digital illumination data sequence generation unit is adapted to generate a digital illumination data sequence representing a time profile of the sequence of the illumination light pulses or of the modulated light. The digital illumination data sequence could further comprise a defined time correlation with the time-dependent sequence of events from the detection of the plurality of photons with the light sensitive detector and/or with the digital patterns in the digital signal.

A light source could be adapted to generate illumination light having a continuous wave characteristic. A trigger-signal generation unit could be adapted to generate a periodic trigger-signal from which the finite time duration is derived. The generated periodic trigger-signal could be used as an internal clock or could be the sample frequency with which the analog signal of the light sensitive detector is sampled/digitized/converted into the digital signal. The sampling of the analog signal of the light sensitive detector is in particular performed in such a way that the time information of the signal sequence is maintained and has a 1 to 1 correspondence to the time-dependent sequence of events. The periodic trigger-signal could comprise a defined time correlation with the time-dependent sequence of events from the detection of the plurality of photons with the light sensitive detector and/or with the digital patterns in the digital signal.

According to a preferred embodiment, the apparatus comprises or is embedded into an imaging device and the imaging device is adapted to illuminate a sample region with the illumination light. Additionally or alternatively, the imaging device could be adapted to image a sample region onto the light sensitive detector. The imaging device could be a light microscope, a scanning microscope or a confocal scanning microscope. The apparatus could comprise more than one light sensitive detector, e.g. for detecting photons having different wavelengths with a spectral selective optical unit and direct the different photons to the different light sensitive detectors.

The photons of light might result from radiative conversion from an excited state to a ground state or to a non-excited state by emitting at least one photon or from a luminescent emission process originating from a sample region, in particular from a fluorescent or a phosphorescent emission process, and/or wherein the photons result from reflected light of the light source.

An overall light intensity of the light source might be selected to be suitable to illuminate a sample region in such a manner that at least some of the single interactions between photons with the light sensitive detector are resolvable in time.

A digital pattern of the digital signal may be generated by determining a first switching instant, being an instant at which there is a change from a lower standardized signal to an upper standardized signal or a change from an upper standardized signal to a lower standardized signal, and a second switching instant, being an instant at which there is a change from an upper standardized signal to a lower standardized signal or a change from a lower standardized signal to an upper standardized signal, and wherein a digital value is assigned to the digital pattern in dependence of the determined first switching instant and the determined second switching instant. In a preferred embodiment, the digital value being assigned is either 0 or 1.

In a preferred embodiment, N-photon events within a time-dependent sequence of events of interactions of a plurality of photons with a light sensitive detector are counted during at least one finite time duration being smaller or equal to the time duration between two subsequent light pulses or at least a fraction of the pixel dwell time of a scanning microscope. Alternatively or additionally, an at least one finite time duration depends on a sample frequency with which an analog signal being outputted by the light sensitive detector is sampled. The sample frequency might comprise a value out of the range of 1 MHz to 20 GHz, wherein the sample frequency, in a preferred embodiment, has a value of 10 GHz.

Embodiments of the present invention relate to a method for counting N-photon events within a time-dependent sequence of events of interactions of a plurality of photons with a light sensitive detector. N may be a natural number being larger than 1. N may be, in a preferred embodiment, 2. An N-photon event may represent an occurrence of at least N timely overlapping single photon events. The light sensitive detector may generate a time-dependent digital signal comprising digital patterns representing the time-dependent sequence of events from the detection of the plurality of photons with the light sensitive detector. Each digital pattern in the digital signal may comprise a digital pattern width having a continuous sequence of digital values representing at least one event of interaction of at least one photon with the light sensitive detector. The method may comprise the following steps: identifying N-photon events from the digital patterns in the digital signal in dependence from the respective digital pattern width, and counting the amount of the N-photon events.

Advantageously, the method of embodiments of the present invention can be adapted to operate the apparatus of one of the embodiments of the present invention. In the knowledge of the apparatus of one of the embodiments of the present invention, it is apparent for a person skilled in the art to provide a method for operating the apparatus of one of the embodiments of the present invention, such that reference is made to the description provided above in order to avoid repetitions.

In embodiments of the present invention, a better determination and/or discrimination of false positive signal may be accomplished by counting and/or measuring and/or imaging results comprising a higher dynamic range. Alternatively or additionally, a better accuracy of counting and/or measuring and/or imaging for the single photon events and the N-photon events can be independent of noise. There might be no dependency of detection system noise or there might be a reduced dependency of detection system noise. This might be accomplished in imaging systems like microscopes.

Embodiments of the present invention provide a computer program with a program code for performing methods of embodiments of the present invention or when the computer program is run on a signal-processing device.

FIG. 1 shows a confocal scanning microscope 10 which can be regarded as an imaging device, which comprises an apparatus according to embodiments of the present invention.

The confocal scanning microscope 10 has a light source 12 designed to emit light with periodic excitation/illumination light pulses. The excitation light labeled as 14 in FIG. 1 falls onto a beam splitter 16, which splits the excitation light 14 into a transmitted component 18 and a reflected component 20.

The excitation light 18 transmitted through the beam splitter 16 passes through an excitation aperture 22 and is then reflected by a dichroic beam splitter 24 in the direction of a scanning unit 26. The scanning unit 26 includes a gimbaled scanning mirror 28, and reflects the excitation light 14, 18 in the direction of a scanning lens 30. After passing through the scanning lens 30 and a tube lens 32, the excitation light enters a microscope objective 34, which directs the excitation light 18 onto a sample 36.

Fluorescent molecules—preferably being specifically bound in or on the sample 36—are excited by the excitation light 14, 18 to emit fluorescent light 38 (indicated by the dashed line, the fluorescent light 38 comprising photons) in the area of the sample 36 illuminated by the excitation light 14, 18. Fluorescence photons constituting fluorescent light 38 propagate along the light path in the reverse direction of the excitation light 18 approaching the sample 36 back to the beam splitter 24. After passing through the beam splitter 24 and a detection aperture 40, the fluorescent light 38 reaches a light sensitive detector 42. The light sensitive detector 42 converts the received fluorescent light 38 into an analog detector signal 43, which is then sent to a signal processing device 44. The signal processing device 44 is designed to sample the analog detector signal 43 in a predetermined sampling cycle and thereby converts the analog detector signal 43 into a time-dependent digital signal. This time-dependent digital signal constitutes a sequence of discrete signal digital values associated with individual sampling intervals corresponding to the sampling cycle. The signal processing device 44 includes a comparator 46 for the purpose of sampling the analog detector signal 43. An analog-digital converter may also be provided instead of the comparator 46.

In addition to the light sensitive detector 42, which converts the received fluorescent light 38 into the analog detector signal, the scanning microscope 10 has a further detector 48 located in the beam path diverted by the beam splitter 16. The further detector 48 therefore receives the portion 20 of the excitation light 14 emitted by the light source 12 and reflected by the beam splitter 16. The further detector 48 converts the portion of the excitation light 20 reflected on the beam splitter 16 into an analog excitation signal 49 and supplies it to the signal processing device 44. The signal processing device 44 samples the analog excitation signal 49 sent to it at the predetermined sampling rate and thus converts the analog excitation signal 49 into a digital signal consisting of a sequence of discrete excitation signal values associated with the individual sampling intervals. To accomplish this, the signal processing device 44 again has a comparator or an analog-digital converter. The analog excitation signal 49 supplied by the second detector 48 and the digital signal generated therefrom by the signal processing device 44 are hereinafter referred to as the analog and digital laser signals, respectively.

In this example, the signal processing device 44 is also designed to control the scanning unit 28 in an essentially known manner.

Amongst others, the signal processing device 44 has the job of determining the detection times at which the light sensitive detector 42 receives one or more fluorescence photons emitted by the sample 36, from the analog detector signal 43 supplied by the detector 42.

The configuration of at least one of the light sensitive detector, detector electronics, and the signal processing device (which might be embodied e.g. in an FPGA) might be embodied as it is disclosed in at least one of the publications WO 2017/202980 A1, EP 2 592 413 A2, US 2013/0119276 A1, WO 2014/059983 A1 and the not yet published DE 10 2018 133 443.5, all these references being incorporated in their entirety herein.

Figure 2:
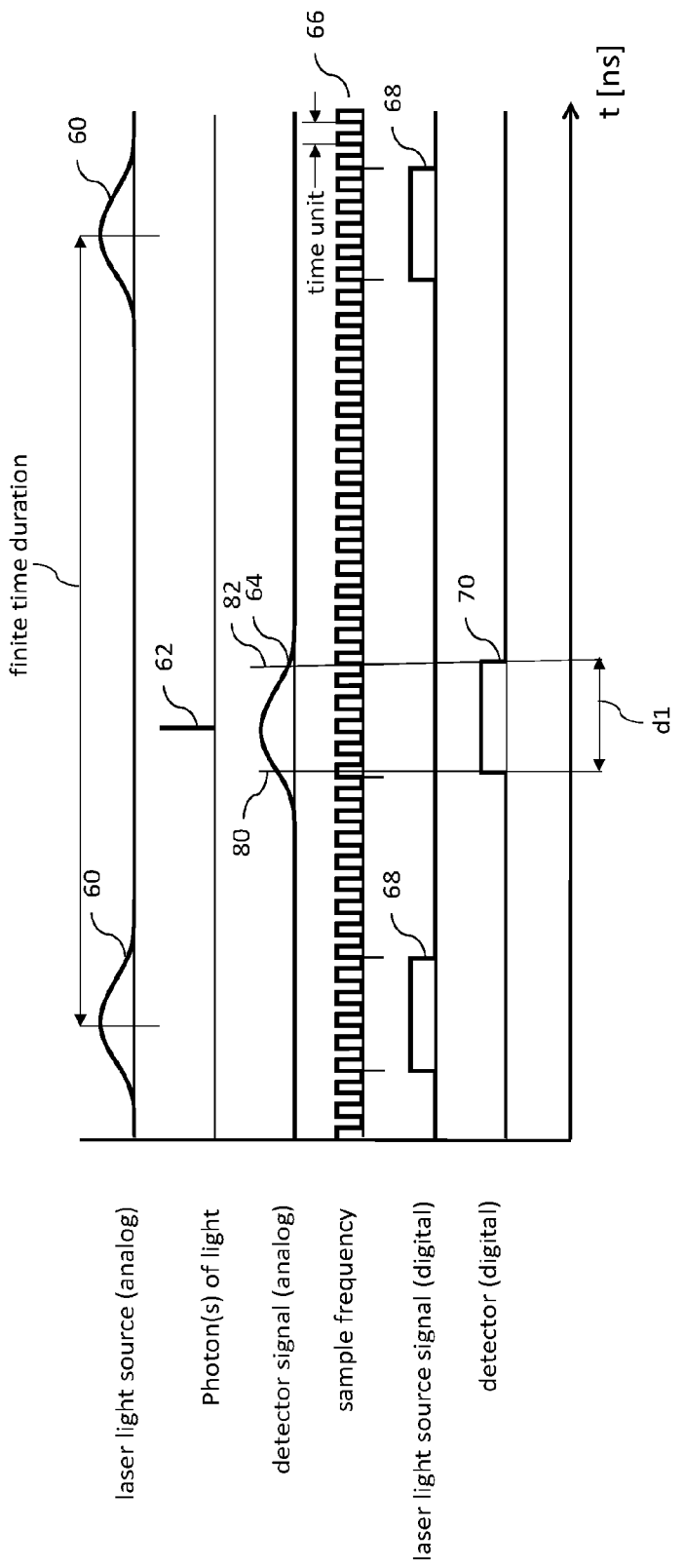
FIGS. 2 to 4 show, schematically, diagrams illustrating examples of laser light source pulses, occurrence of photons and detection signals as a function of time.
Figure 3:
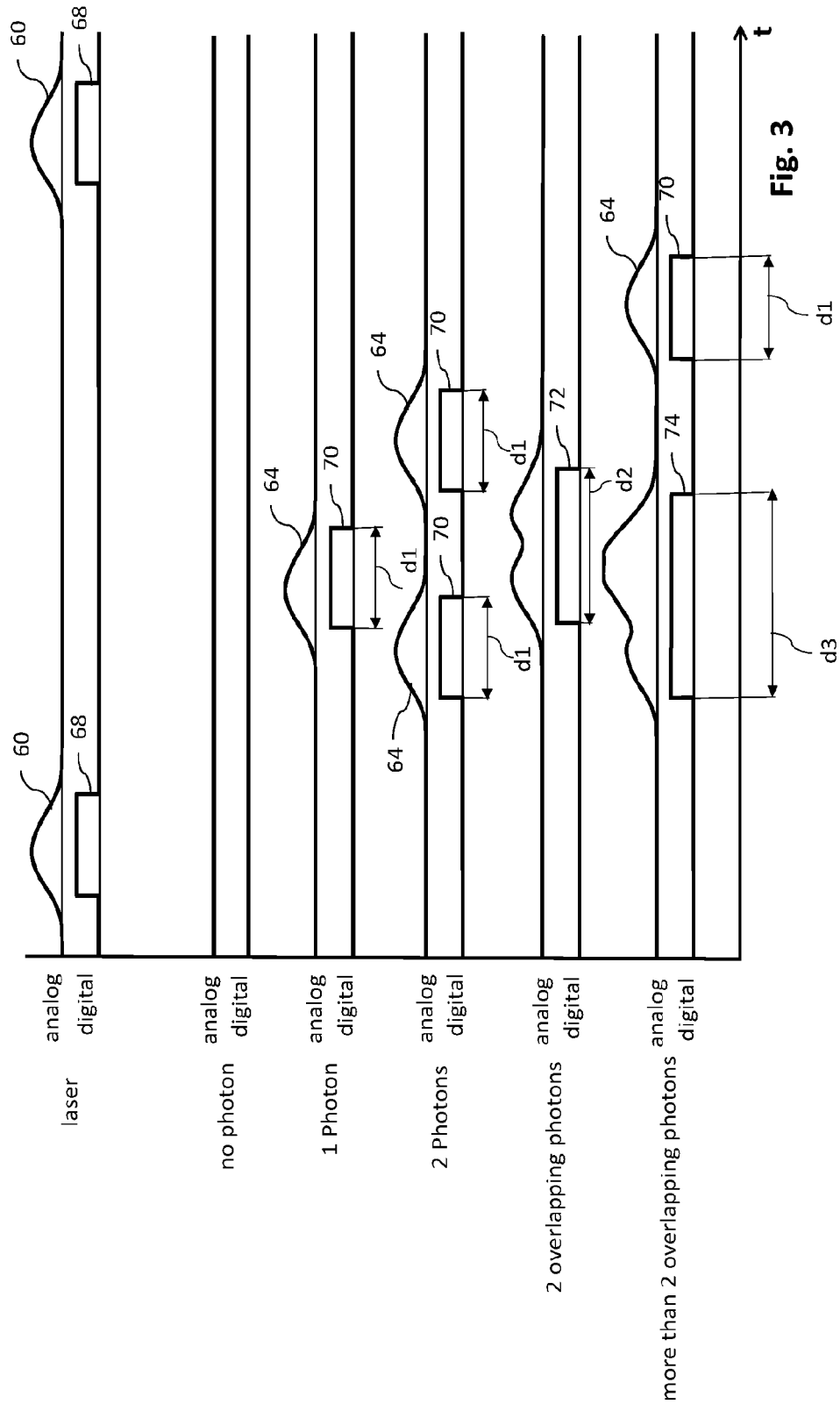
Figure 4:
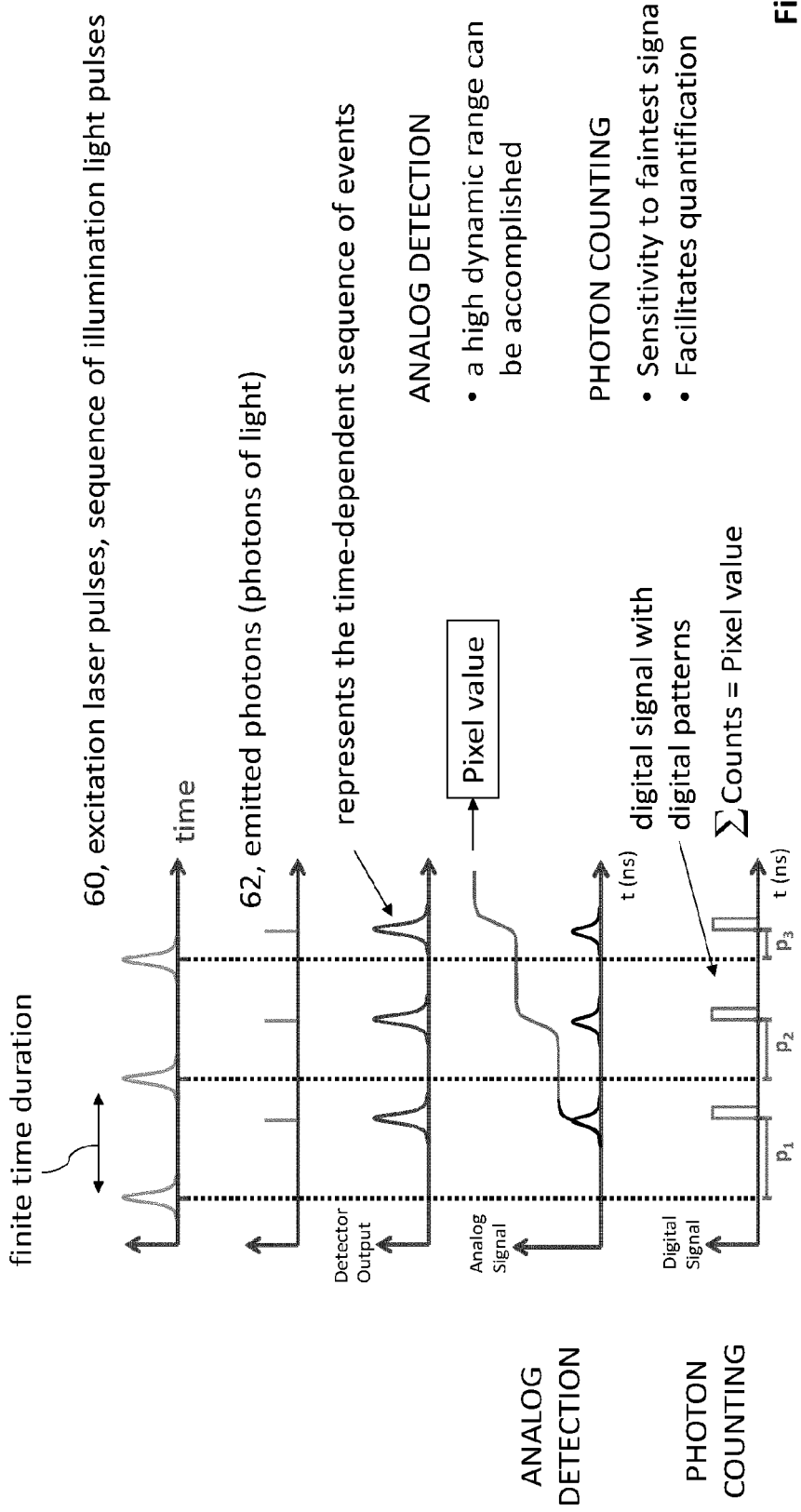

The role of the signal processing device 44 described above is illustrated in the following discussion on the basis of the diagrams shown as an example in FIGS. 2 and 3. FIGS. 2 to 4 respectively show schematically diagrams illustrating examples of laser light source pulses, the occurrence of photons and analog and digital detection signals as a function of time t. The time scale could be arbitrary units, in this example the time scale indicated ns.

Even though a laser light source comprising a continuous wave characteristic could be applied according to the present invention, FIGS. 2 to 4 show light pulses and digital patterns 68 thereof for the illumination of the sample 36 being generated by the laser light source 12 which is adapted to generate a sequence of illumination light pulses.

FIG. 2 shows an example scenario of illumination light pulses and detection signals. In particular, in the top diagram the analog signal 60 representing a sequence of two adjacent light pulses emitted by the laser light source 12 are shown. In the diagram below, an example of a photon 62 of fluorescence light 38 interacting with the light sensitive detector 42 is shown. In the diagram below, the analog detector signal 43, 64 is shown which is generated by the light sensitive detector 42. In the diagram below, the sample frequency 66 with which the analog detector signal 43, 64 of the light sensitive detector 42 and the detection signal 49 from the further detector 48 is sampled. In this example, the sample frequency has a value of 10 GHz. In the diagram below, digital patterns 68 of the digital laser light source signal of the digitized signal 49 being generated by the detector 48 after an interaction of the light pulses of laser 12 with the detector 48 is shown. In the diagram below, a digital pattern 70 of the time-dependent digital signal of the digitalized analog detector signal 64 is shown.

FIG. 3 shows example scenarios of illumination light pulses and different photon events as a function of time. In particular, in the top diagram ("laser") the analog signals 60 representing a sequence of two adjacent light pulses emitted by the laser light source 12 as well as the digital patterns 68 of the digital laser light source signal of the digitized signal 49 being generated by the detector 48 after an interaction of the light pulses of laser 12 with the detector 48 are shown.

In the diagram below ("no photon"), an example is shown where there is no photon event and therefore no interaction of a photon with the light sensitive detector 42. Therefore, the analog and digital signal comprises a constant value of 0.

In the diagram below ("1 photon"), an example of a single photon of fluorescence light 38 interacting with the light sensitive detector 42 is shown as well as the digital pattern 70 of the time-dependent digitalized signal of the analog detector signal 64. Thus, here is shown a single photon event representing one interaction of a photon with the light sensitive detector 42.

In the diagram below ("2 photons"), an example of two single photons of fluorescence light 38 interacting with the light sensitive detector 42 is shown as well as the digital patterns 70 of the time-dependent digital signal of the digitalized analog detector signal 64. These two photons have a temporal distance being large enough such that they can be distinguished as two single photon events because the two the digital patterns 70 are spaced apart from each other and there is even at least one 0 value of the time-dependent digital signal in between the two digital patterns 70.

In the diagram below ("2 overlapping photons"), an example of two single photons of fluorescence light 38 interacting with the light sensitive detector 42 is shown as well as the digital pattern 72 of the time-dependent digital signal of the digitalized analog detector signal. These two photons have a temporal distance not being large enough and therefore they cannot be distinguished as two single photon events.

In the diagram below ("more than 2 overlapping photons"), an example of more than two photons of fluorescence light 38 interacting with the light sensitive detector 42 is shown as well as the digital patterns 74, 72 of the time-dependent digital signal of the digitalized analog detector signal. On the left, a plurality of photons having a temporal distance being not large enough and therefore they cannot be distinguished as single photon events, because the digital pattern 74 is the result of the occurrence of timely overlapping single photon events. However, the photon event being represented by the digital pattern 70 on the right side can be identified as a single photon event.

Figure 5:
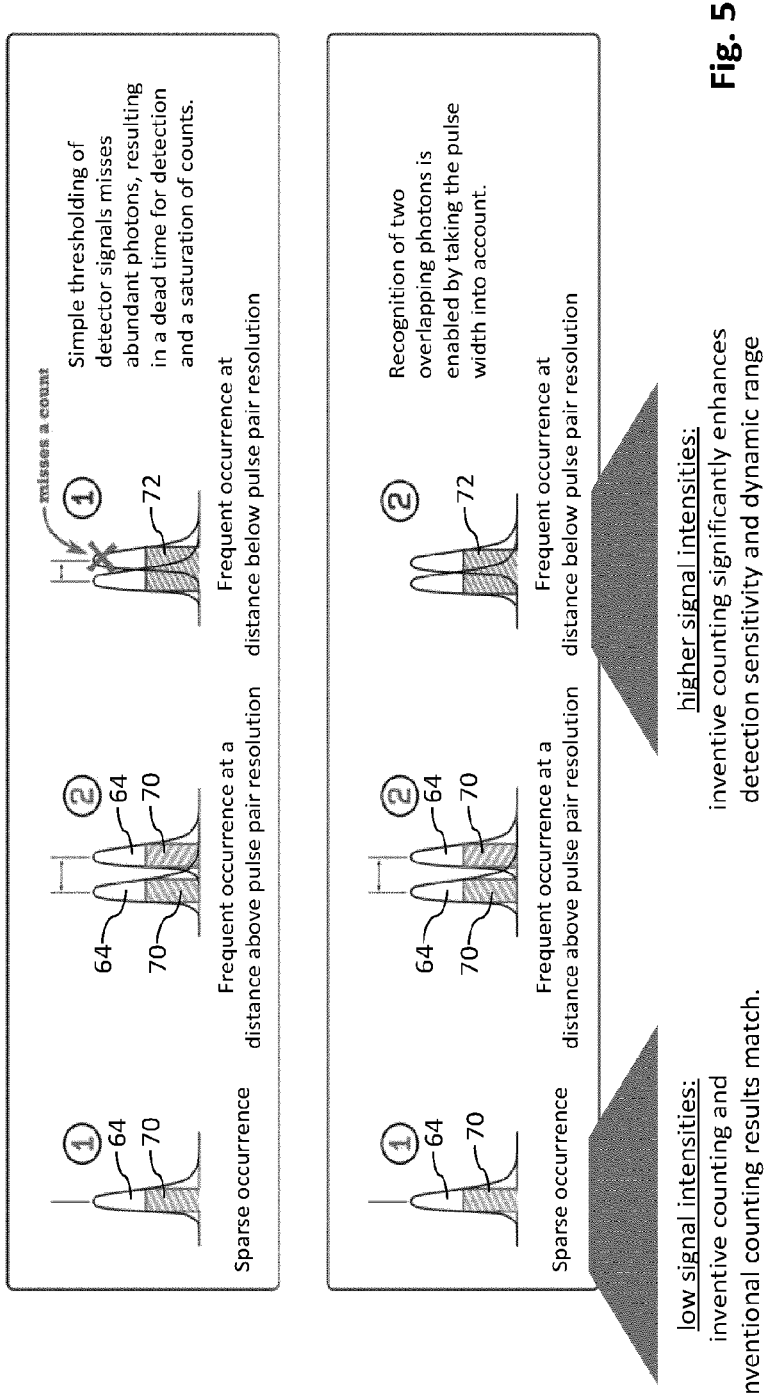
FIG. 5 shows, schematically, examples of identification of single and N-photon events.

FIG. 5, top part, shows an example of the identification of occurrences of different photon events and their analog detector signals 64. On the left side, there is shown a situation comparable to the one shown in FIG. 2 or the "1 photon" diagram of FIG. 3. In the middle, there is shown a situation comparable to the one shown in the "2 photon" diagram of FIG. 3. On the right, there is shown a situation comparable to the one shown in the "2 overlapping photons" diagram of FIG. 3. This situation of two overlapping photons cannot accurately be identified as a two-photon event according to identification schemes which have been known in the prior art and would most likely be identified as a one-photon event. The result of the identification of the single- or two-photon events are shown by the numbers in the circle, i.e. 1 or 2.

FIG. 5, bottom part, shows an example of operation of the apparatus according to the present invention which is configured to count N-photon events within a time-dependent sequence of events of interactions of a plurality of photons 62 with a light sensitive detector 42, wherein N is a natural number being larger than 1, wherein N is preferably 2. An N-photon event represents an occurrence of at least N timely overlapping single photon events 62. The apparatus comprises the signal-processing device 44 and the light sensitive detector 42, see FIG. 1. The light sensitive detector 42 is adapted to generate a time-dependent digital signal comprising digital patterns 70, 72, 74 representing the time-dependent sequence of events from the detection of the plurality of photons 62 with the light sensitive detector 42. Each digital pattern 70, 72, 74 in the digital signal comprises a digital pattern width d1, d2, d3, see e.g. FIG. 3, having a continuous sequence of digital values 0 and 1—the digital value 0 represents a detector signal being lower than a pre-defined switching instant and the value 1 represents a digital value being larger than a pre-defined switching instant—representing at least one event of interaction of at least one photon 62 with the light sensitive detector 42. The signal-processing device 44 is adapted to identify N-photon events from the digital patterns 70, 72, 74 in the digital signal in dependence from the respective digital pattern width d1, d2, d3, and the amount of the N-photon events are counted.

FIG. 5, bottom part: again, on the left side, there is shown a situation comparable to the one shown in FIG. 2 or the "1 photon" diagram of FIG. 3. In the middle, there is shown a situation comparable to the one shown in the "2 photon" diagram of FIG. 3. On the right, there is shown a situation comparable to the one shown in the "2 overlapping photons" diagram of FIG. 3. This situation of two overlapping photons is correctly identified as a two-photon event according to embodiments of the present invention by considering the digital pattern width d2 of the digital pattern 72. Thus, the correct result of the identification of the single- or two-photon events are shown by the number in the circle, i.e. 1 or 2. This result is much closer to the real truth of the physical interaction of single photons with the light sensitive detection, as this is illustrated in FIG. 6. FIG. 6 shows schematically a diagram of the signal counts per second as a function of the illumination light intensity being the excitation intensity in the case the photons are generated by e.g. one or more fluorescent dyes. In FIG. 6 the dotted line indicates the ideal linear relationship between the excitation intensity, which can be selected or adjusted by selecting the intensity of the light emitted by the light source, and the counts per second of detected events of interactions of the photons with the light sensitive detector which can be counted.

In an example, let N be 2. Therefore, an event is identified as a 2-photon event if the digital pattern width d2 of the digital pattern 72 is larger than 1 time of the digital pattern width d1 being representative for a single photon event. Furthermore, a digital pattern 72 is identify as an 2-photon event, if the digital pattern width d2 of the digital pattern 72 is larger than the digital pattern width d1 being representative for a single photon event and is smaller or equal than two times of the digital pattern width d1 being representative for a single photon event. Such an example is shown in FIG. 5, bottom part, in the right side diagram or in FIG. 3 in the "2 overlapping photons" diagram.

An event is identified as a single photon event if the digital pattern 70 of the digital pattern 70 is representing the X times of the time duration of an impulse response of a single photon event, wherein X is a real number out of the range between 0.5 and 1.5, wherein X is preferably 1.0. This is shown e.g. in FIG. 5, bottom part, left side and middle diagram or in FIG. 3 in the "1 photon" or in the "2 photons" diagram. The apparatus according to a preferred embodiment of the invention is preferably further configured to consider the count of the identified single photon events as well.

In a preferred embodiment and in order to reduce the uncertainty of signal in the detection system from the measured photons, and/or in order to "clean up" unlikely photon events, the detector signal and in particular the analog detector signal might be analyzed in a part of the electrical circuitry of the light sensitive detector being upstream of the signal-processing device 44.

In the examples shown in FIGS. 2 to 5, the digital illumination data sequence comprises a defined time correlation with the time-dependent sequence of events from the detection of the plurality of photons 62 with the light sensitive detector 42 as well as with the digital patterns 70, 72, 74 in the digital signal.

The sampling frequency shown in FIG. 2 can be regarded as a periodic trigger-signal.

The sampling frequency comprises a defined time correlation with the time-dependent sequence of events from the detection of the plurality of photons 62 with the light sensitive detector 42 as well as with the digital patterns 70, 72, 74 in the digital signal.

In an embodiment, it may be advantageous to select the overall light intensity of the light source 12 such that the sample 36 or a sample region thereof is illuminated in such a manner that at least some of the single interactions between photons 62 with the light sensitive detector 42 are resolvable in time.

The generation of a digital pattern 70, 72, 74 of the digital signal from the analog signal is explained in an example by referring to FIG. 2. The digital pattern 70 is generated utilizing standardized electrical signals or digital values, namely the binary digits 0 and 1 in this example, and in such a way that either a lower digital value, namely 0, is set if the amplitude of the analog signal being sampled is below a defined analog value threshold, or an upper digital value, namely 1, is set if the amplitude of the analog signal being sampled is above a defined analog value threshold. The thresholds may be the same, but do not necessarily have to be the same. In this example, the defined thresholds for the amplitude of the analog signal are essentially the half of the maximum of the amplitude of the analog signal of an analog signal pulse. Thus, the first switching instant 80 is defined to be the instant at which there is a change from a lower standardized signal, namely 0, to an upper standardized signal. The second switching instant 82 is defined to be the instant at which there is a change from an upper standardized signal, namely 1, to a lower standardized signal.

One result of a measurement with the apparatus according to embodiments of the present invention might be that N-photon events and/or single photon events within a time-dependent sequence of events of interactions of a plurality of photons with a light sensitive detector 42 are counted during at least one finite time duration being smaller or equal to the time duration between two subsequent light pulses. Alternatively, N-photon events and/or single photon events within a time-dependent sequence of events of interactions of a plurality of photons with a light sensitive detector 42 could be counted during at least a fraction of the pixel dwell time of a scanning microscope. An at least one finite time duration could depend on a sample frequency with which an analog signal of the light sensitive detector 42 is sampled. The sample frequency comprises a value of 10 GHz in the present example.

As used herein the term "and/or" includes any and all combinations of one or more of the associated listed items and may be abbreviated as "/".

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Some embodiments relate to a microscope comprising a system as described in connection with one or more of the FIGS. 1 to 6. Alternatively, a microscope may be part of or connected to a system as described in connection with one or more of the FIGS. 1 to 6. FIG. 7 shows a schematic illustration of a system 700 configured to perform a method described herein. The system 700 comprises a microscope 710 and a computer system 720. The microscope 710 is configured to take images and is connected to the computer system 720. The computer system 720 is configured to execute at least a part of a method described herein. The computer system 720 may be configured to execute a machine learning algorithm. The computer system 720 and microscope 710 may be separate entities but can also be integrated together in one common housing. The computer system 720 may be part of a central processing system of the microscope 710 and/or the computer system 720 may be part of a subcomponent of the microscope 710, such as a sensor, an actor, a camera or an illumination unit, etc. of the microscope 710.

The computer system 720 may be a local computer device (e.g. personal computer, laptop, tablet computer or mobile phone) with one or more processors and one or more storage devices or may be a distributed computer system (e.g. a cloud computing system with one or more processors and one or more storage devices distributed at various locations, for example, at a local client and/or one or more remote server farms and/or data centers). The computer system 720 may comprise any circuit or combination of circuits. In one embodiment, the computer system 720 may include one or more processors which can be of any type. As used herein, processor may mean any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), multiple core processor, a field programmable gate array (FPGA), for example, of a microscope or a microscope component (e.g. camera) or any other type of processor or processing circuit. Other types of circuits that may be included in the computer system 720 may be a custom circuit, an application-specific integrated circuit (ASIC), or the like, such as, for example, one or more circuits (such as a communication circuit) for use in wireless devices like mobile telephones, tablet computers, laptop computers, two-way radios, and similar electronic systems. The computer system 720 may include one or more storage devices, which may include one or more memory elements suitable to the particular application, such as a main memory in the form of random access memory (RAM), one or more hard drives, and/or one or more drives that handle removable media such as compact disks (CD), flash memory cards, digital video disk (DVD), and the like. The computer system 720 may also include a display device, one or more speakers, and a keyboard and/or controller, which can include a mouse, trackball, touch screen, voice-recognition device, or any other device that permits a system user to input information into and receive information from the computer system 720.

Some or all of the method steps may be executed by (or using) a hardware apparatus, like for example, a processor, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the present invention is, therefore, a computer program having a program code for performing one of the methods described herein, when the computer program runs on a computer.

A further embodiment of the present invention is, therefore, a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. A further embodiment of the present invention is an apparatus as described herein comprising a processor and the storage medium.

A further embodiment of the invention is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An apparatus configured to count N-photon events within a time-dependent sequence of events of interactions of a plurality of photons with a light sensitive detector, the apparatus comprising:
    a signal-processing device; and
    the light sensitive detector,
    wherein N is a natural number being larger than 1,
    wherein an N-photon event of the N-photon events represents an occurrence of at least N timely overlapping single photon events,
    wherein the light sensitive detector is adapted to generate a time-dependent digital signal comprising digital patterns representing the time-dependent sequence of events from the detection of the plurality of photons with the light sensitive detector,
    wherein each digital pattern in the digital signal comprises a digital pattern width having a continuous sequence of digital values representing at least one event of interaction of at least one photon with the light sensitive detector,
    wherein the signal-processing device is adapted to identify N-photon events from the digital patterns in the digital signal in dependence from the respective digital pattern width,
    wherein the amount of the N-photon events are counted,
    wherein the signal-processing device is configured to identify at least one digital pattern as the N-photon event if the digital pattern width of the at least one digital pattern is larger than N−1 times of the digital pattern width being representative for a single photon event.

2. The apparatus of claim 1, wherein the signal-processing device is adapted to identify at least one digital pattern as the N-photon event, if the digital pattern width of the at least one digital pattern is larger than the digital pattern width being representative for a single photon event and is smaller than or equal to N times of the digital pattern width being representative for the single photon event.

3. The apparatus of claim 1, the apparatus being further configured such that the signal-processing device is adapted to identify at least one digital pattern as a single photon event if the digital pattern width of the at least one digital pattern is representing X times of a time duration of an impulse response of the single photon event, wherein X is a real number out of a range between 0.5 and 1.5.

4. The apparatus of claim 1, wherein the signal-processing device is adapted to identify at least one digital pattern as a false positive signal if the digital values of the digital pattern do not represent an event of interaction of a photon with the light sensitive detector or if the digital pattern width of the digital pattern is smaller than Y times of a time duration of an impulse response of a single photon event, wherein Y is a real number out of a range between 0.0 and 0.49.

5. The apparatus of claim 1, wherein a light source is adapted to generate a sequence of illumination light pulses or to generate modulated light.

6. The apparatus of claim 5, wherein a digital illumination data sequence generation unit is adapted to generate a digital illumination data sequence representing a time profile of the sequence of the illumination light pulses or of the modulated light.

7. The apparatus of claim 6, wherein the digital illumination data sequence comprises a defined time correlation with the time-dependent sequence of events from a detection of the plurality of photons with the light sensitive detector and/or with the digital patterns in the digital signal.

8. The apparatus of claim 1, wherein a light source is adapted to generate illumination light having a continuous wave characteristic and wherein a trigger-signal generation unit is adapted to generate a periodic trigger-signal from which a finite time duration is derived.

9. The apparatus of claim 8, wherein the periodic trigger-signal comprises a defined time correlation with the time-dependent sequence of events from a detection of the plurality of photons with the light sensitive detector and/or with the digital patterns in the digital signal.

10. The apparatus of claim 1, wherein an imaging device is adapted to illuminate a sample region with the illumination light and/or is adapted to image a sample region onto the light sensitive detector.

11. The apparatus of claim 1, wherein an overall light intensity of a light source is selected to be suitable to illuminate a sample region in such a manner that at least some of single interactions between photons with the light sensitive detector are resolvable in time.

12. The apparatus of claim 1, wherein at least one digital pattern of the digital signal is generated by determining a first switching instant, being an instant at which there is a change from a lower standardized signal to an upper standardized signal or a change from an upper standardized signal to a lower standardized signal, and a second switching instant, being an instant at which there is a change from an upper standardized signal to a lower standardized signal or a change from a lower standardized signal to an upper standardized signal, and wherein a digital value is assigned to the digital pattern in dependence of the determined first switching instant and the determined second switching instant.

13. The apparatus of claim 1, wherein the N-photon events within the time-dependent sequence of events of interactions of the plurality of photons with the light sensitive detector are counted during at least one finite time duration being smaller or equal to a time duration between two subsequent light pulses or at least a fraction of the pixel dwell time of a scanning microscope, and/or wherein the at least one finite time duration depends on a sample frequency with which an analog signal of the light sensitive detector is sampled, wherein the sample frequency comprises a value out of the range of 1 MHz to 20 GHz.

14. A method for counting N-photon events within a time-dependent sequence of events of interactions of a plurality of photons with a light sensitive detector, wherein N is a natural number being larger than 1, wherein an N-photon event represents an occurrence of at least N timely overlapping single photon events, wherein the light sensitive detector generates a time-dependent digital signal comprising digital patterns representing the time-dependent sequence of events from the detection of the plurality of photons with the light sensitive detector, wherein each digital pattern in the digital signal comprises a digital pattern width having a continuous sequence of digital values representing at least one event of interaction of at least one photon with the light sensitive detector, wherein the method comprises the following steps:
identifying the N-photon events from the digital patterns in the digital signal in dependence from the respective digital pattern width using a signal-processing device; and
counting the amount of the N-photon events,
wherein the signal-processing device is configured to identify at least one digital pattern as the N-photon event if the digital pattern width of the at least one digital pattern is larger than N−1 times of the digital pattern width being representative for a single photon event.

15. The method of claim 14, wherein the plurality of photons of light result from a radiative conversion from an excited state to a ground state by emitting at least one photon or from a luminescent emission process originating from a sample region, or wherein the plurality of photons result from reflected light of a light source.

16. A non-transitory computer-readable medium storing program code for performing, when executed by one or more processors, the method of claim 14.

* * * * *